United States Patent [19]
Fleming et al.

[11] Patent Number: 5,744,930
[45] Date of Patent: Apr. 28, 1998

[54] UNIVERSAL BATTERY COMPARTMENT

[75] Inventors: James Harvey Fleming, Phoenix; Theodore Woolley Keller, Scottsdale; David Moon Yee, Scottsdale; Bennett Charles Beaudry, Scottsdale, all of Ariz.

[73] Assignee: Motorola, Inc., Schaumburg, Ill.

[21] Appl. No.: 795,747

[22] Filed: Feb. 6, 1997

[51] Int. Cl.⁶ .................... H02J 7/00; H01M 2/10
[52] U.S. Cl. ............................... 320/2; 429/99
[58] Field of Search ................... 320/2; 429/96, 429/97, 99, 164, 165, 163, 167, 170; 206/703

[56] References Cited

U.S. PATENT DOCUMENTS

| | | |
|---|---|---|
| 4,835,410 | 5/1989 | Bhagwat et al. ............... 307/64 |
| 5,153,495 | 10/1992 | Connors ........................... 320/2 |
| 5,302,110 | 4/1994 | Desai et al. ..................... 429/96 |
| 5,486,432 | 1/1996 | Sharrah et al. ................. 429/99 |
| 5,600,223 | 2/1997 | Shirai ............................... 320/2 |

*Primary Examiner*—Peter S. Wong
*Assistant Examiner*—Patrick B. Law
*Attorney, Agent, or Firm*—Frederick M. Fliegel

[57] ABSTRACT

A battery compartment (12) adapted to accommodate any of several different types of batteries (30, 32, 34). The compartment (12) includes a hollow region having a length equivalent to that of one or more batteries (31, 33, 35) and includes a positive contact (65) disposed at one end thereof. The compartment also includes a cap (14) adapted to couple to an end of the compartment (12) remote from the one end. The one end includes a first contact (65) and one or more additional positive contacts (63). The additional positive contacts (63) are coupled to anodes of diodes (64) having cathodes coupled to the positive contact (65).

20 Claims, 2 Drawing Sheets

5,744,930

UNIVERSAL BATTERY COMPARTMENT

FIELD OF THE INVENTION

This invention relates in general to the field of power sources for portable emergency radios, in particular to batteries and battery receptacles for such radios and more particularly to an improved battery receptacle allowing usage of multiple battery types for a given portable emergency radio.

BACKGROUND OF THE INVENTION

Batteries are important for many electronic products which require portability and which require reliability.

Conventional emergency radio battery receptacles suffer from lack of flexibility in terms of the types of batteries that may be usefully accommodated therein. For example, an emergency radio is required to be operable over a broad range of temperatures, including lower temperatures at which conventional batteries fail to deliver reliable power. This, in turn, necessitates usage of cells such as the $Li:SO_2$ cells (e.g., P/N BA 5590/U or BA 5112/U) manufactured by Saft America Inc. of Baldes, N.C. These battery packs are made to order to the buyer's specifications and typically include circuitry (e.g., a diode in series with a fuse) to prevent inadvertent recharging in chargers designed to recharge NiCd batteries or rapid discharge, because the $Li:S0_2$ batteries tend to "vent" or "explode" when handled in this fashion. Typically, a switch and a discharge resistor are also included to allow complete discharge of the battery when it is discarded. These elements, together with the batteries themselves, lead to substantial per-pack costs for these types of batteries.

It has been especially uneconomical and impractical to provide for usage of low-cost, readily available batteries for applications, such as training exercises, that do not require the additional features that are highly desirable or essential for reliable and robust operation under field conditions. Additionally, should the primary battery fail, the radio generally is not easily adaptable to accommodate those types of batteries that are readily available in a wide variety of settings.

Thus, what is needed is a practical, economical battery compartment for portable radios, particularly one that easily accommodates inexpensive and widely available types of cells.

DETAILED DESCRIPTION OF THE DRAWINGS

Figure 1:
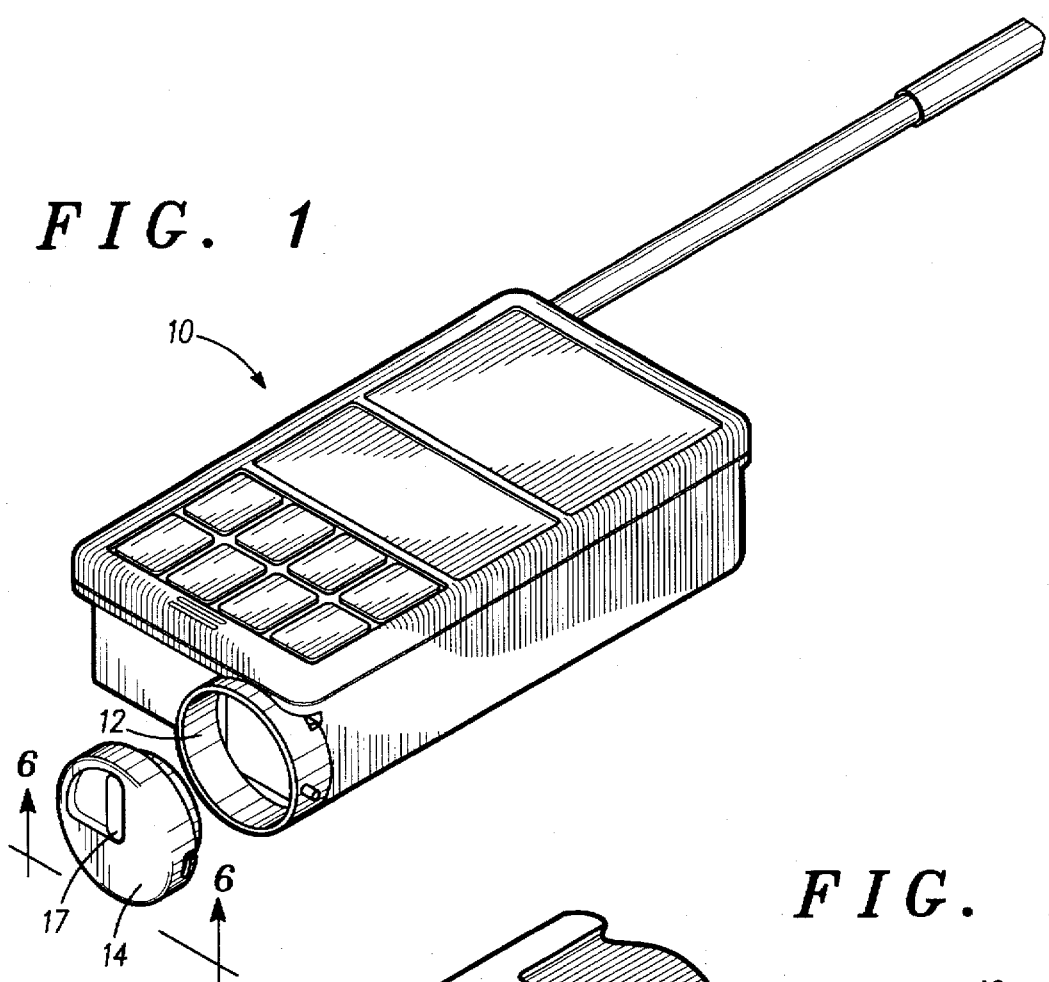
FIG. 1 is a simplified isometric view of a portable emergency radio, showing the battery compartment and cap, in accordance with the present invention.

FIG. 1 is a simplified isometric view of portable emergency radio 10, showing battery compartment 12 and cap 14, in accordance with the present invention. Portable emergency radio 10 is usefully an AN/PRC-112(V) manufactured by Motorola of Scottsdale, Ariz., and is of the type employed by military aircraft to enable downed pilots to signal to rescue teams.

Figure 2:
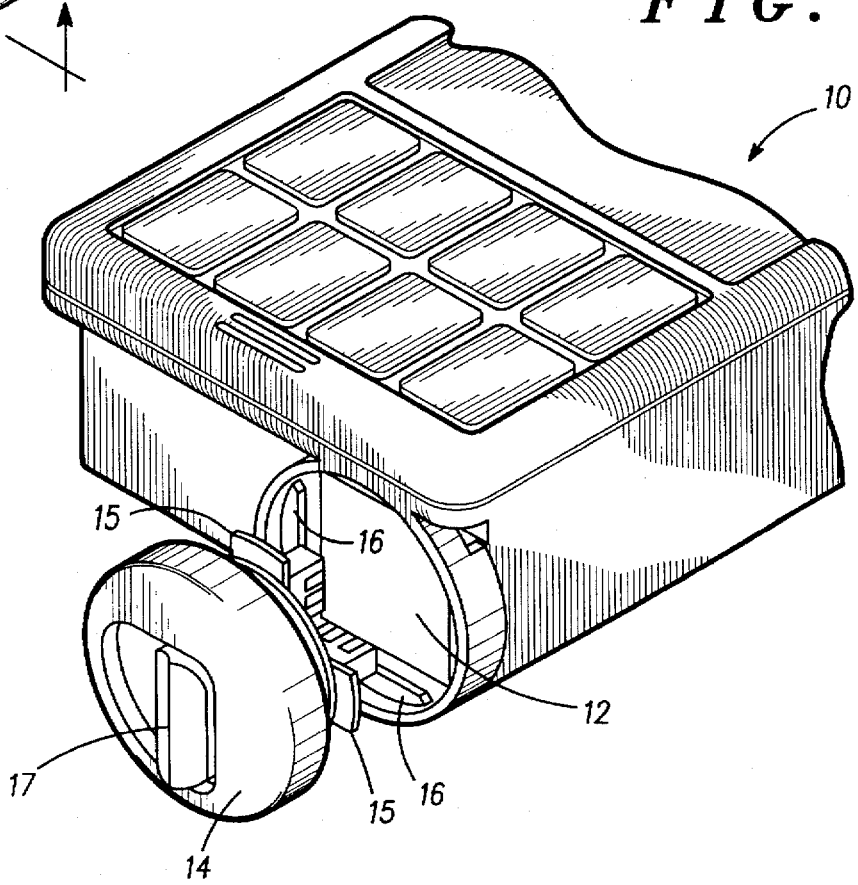
FIG. 2 is a simplified and enlarged isometric view of the battery compartment and cap for the portable emergency radio, in accordance with the present invention.

FIG. 2 is a simplified and enlarged isometric view of a portion of radio 10, battery compartment 12 and cap 14, in accordance with the present invention. In use, cap 14 is removed by twisting it to disengage tabs 15 from tabs 16 disposed at one end of compartment 12. Electrical contact from cap 14 to radio 10 is effectuated via a contact at the end of compartment 12 that couple to a contact disposed on cap 14 (contacts not illustrated) when cap 14 is twisted into the end of compartment 12. Switch 17 is the system on/off switch, which is placed on the replaceable cap because it is a mechanical component and as such is subject to degradation due to contamination and/or wear. This allows the system switch to be easily and inexpensively replaced, either as a prophylactic measure (i.e., on a time schedule) or as indicated by, for example, measured increase in contact resistance.

Figure 3:
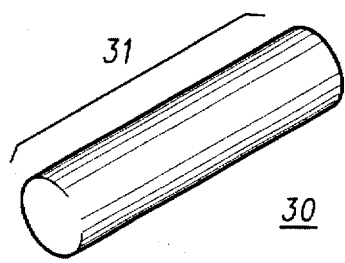
FIGS. 3, 4 and 5 are simplified isometric views of different types of battery packs, in accordance with the present invention.
Figure 5:
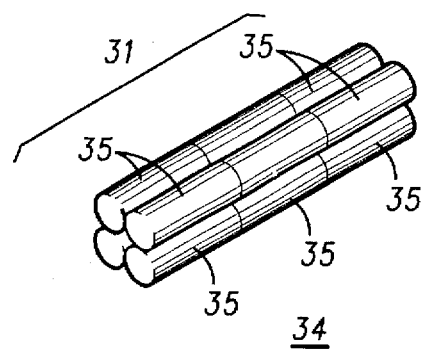
Figure 4:
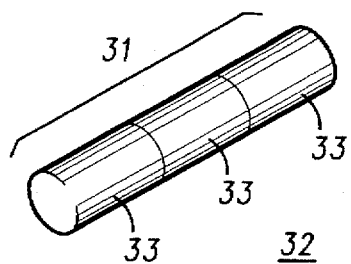

FIGS. 3, 4 and 5 are simplified isometric views of different types of battery packs 30, 32, 34, respectively, in accordance with the present invention. Battery pack 30 is desirably an $Li:S0_2$ battery including protection circuitry to prevent recharging and allowing for discharge of the battery when it is discarded, such as the BA 5590/U or BA5112/U batteries manufactured by Saft America Inc. of Baldes, N.C. Battery pack 32 is usefully three "C" cells of any type (e.g., C—Zn, NiCd, alkaline, Nickel Metal Hydride or NmH) and usefully may be rechargeable. Battery pack 34 is usefully a group of twelve "AA" cells, arranged in four groups of three each, and the AA cells also may be of any readily available type. It will be appreciated that battery pack 34 could comprise fewer groups of three cells and still provide the correct voltage.

Figure 6:
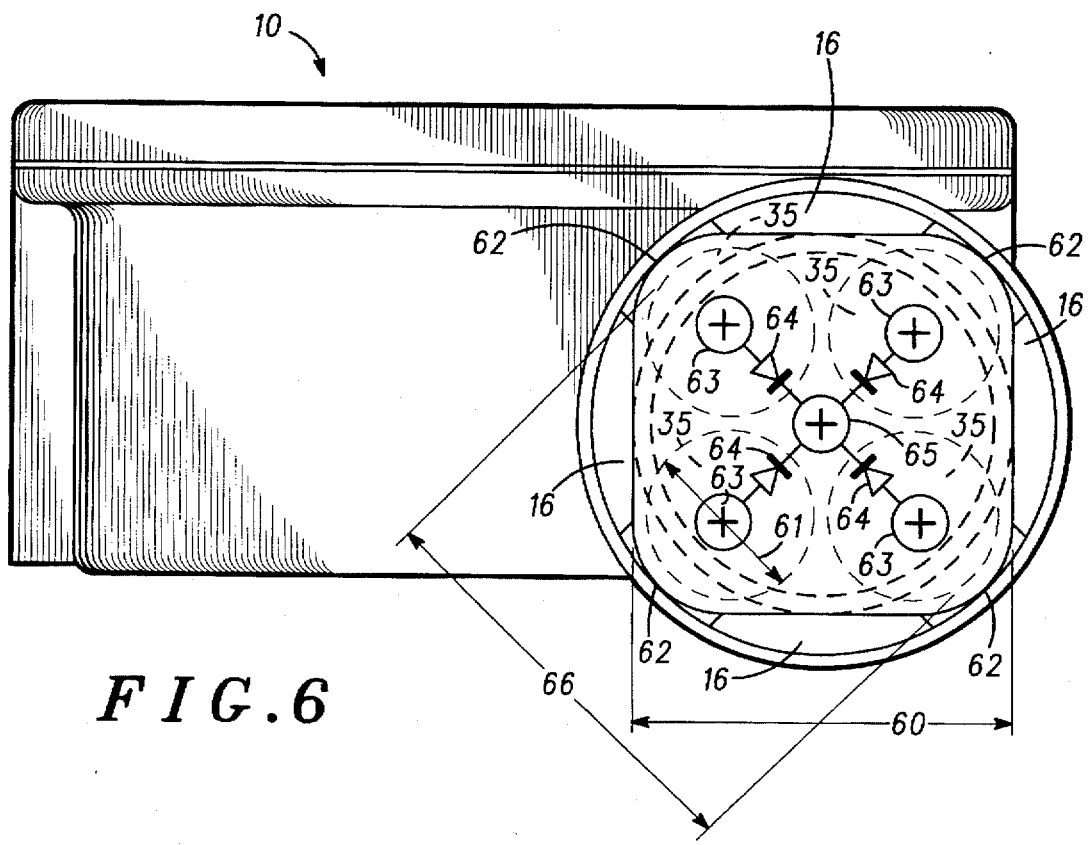
FIG. 6 a simplified end view, in partial section, taken along section lines 6—6 of FIG. 1, of the battery compartment and cap, in accordance with the present invention.

FIG. 6 is a simplified end view, in section, taken along section lines 6—6 of FIG. 1, of battery compartment 12, in accordance with the present invention. The end of battery compartment 12 remote from cap 14 includes five contacts having the designation "+" comprising four positive contacts 63 disposed to couple to the positive terminals of batteries comprising battery pack 34 (FIG. 5) and fifth positive contact 65 centrally disposed with respect to positive contacts 63 and disposed to couple to the positive contact of either battery pack 30 or 32. All of battery packs 30, 32, 34 have length 31 equal to about 150.1 mm (5.91"), but battery packs 30, 32, 34 have varying diameters.

Width 60 is chosen to accommodate battery packs 30, 32 and is about 29.5 mm (1.16") (the diameter of battery pack 30), which can also accommodate C cells (i.e., battery pack 32) having a diameter of about 25.01 mm (1.025"). Corners 62 would occupy additional space if chosen to be square but must have a radius large enough to allow AA cells to nest therein as illustrated, when corners 62 are placed closer together. In other words, corners 62 must have a diagonal separation of at least 33.72 mm (1.3277") and, at this separation, a suitable radius of curvature, because AA batteries have diameter 61 of about 14 mm (0.55").

Positive contacts 63 are each coupled to an anode of diodes 64, which in turn have a cathode coupled to positive contact 65. Diodes 64 may comprise silicon rectifiers such as 1N4041 diodes, or may be chosen to be Schottky barrier or germanium diodes to reduce forward voltage drop across the diodes when supply voltage to radio 10 is of concern. Diodes 64 ensure that a short in one or more of the stacks of cells 35 will not disable battery pack 34 and/or radio 10 and assures that a short in one stack will not discharge the other stacks of batteries 34. Each of battery packs 30, 32, 34 has a negative terminal that contacts a common terminal in cap 14 in the conventional fashion (not illustrated). Positive contacts 63 are symmetrically disposed with respect to centrally-disposed positive contact 65 and are separated therefrom by a center-to-center distance of about 9.9 millimeters.

Thus, a battery compartment adapted to accommodate several different types of batteries has been described which overcomes specific problems and accomplishes certain advantages relative to prior art methods and mechanisms. The improvements over known technology are significant. The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments. For example, the embodiment discussed supra combines positive terminals of batteries via diodes. It will be appreciated that diodes could be used to combine negative terminals of groups of batteries.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A battery compartment adapted to accommodate any of several different types of batteries, said compartment comprising:

a hollow region having a length equivalent to that of one or more batteries and including a group of first contacts disposed at one end thereof, wherein one of said group is centrally disposed and others of said group are each coupled to one of a first end of first through fourth diodes, wherein a second end of each of said diodes is coupled to said one of said group; and a cap adapted to couple to an end of said compartment remote from said one end, said cap including a second contact.

2. A battery compartment as claimed in claim 1, wherein said hollow region has a length of about one hundred and fifty millimeters.

3. A battery compartment as claimed in claim 1, wherein said hollow compartment has a minimum cross-sectional width of twenty-nine and a half millimeters.

4. A battery compartment as claimed in claim 1, wherein said others of said group comprise four additional contacts symmetrically disposed about said one of said group.

5. A battery compartment as claimed in claim 4, wherein said others of said group are separated from said one of said group such that a center-to-center distance therebetween is on the order of nine point nine millimeters.

6. A battery compartment as claimed in claim 1, wherein said first through fourth diodes comprise diodes chosen from a group consisting of silicon Schottky barrier diodes, silicon rectifiers and germanium diodes.

7. A battery compartment as claimed in claim 1, wherein said first ends of said diodes comprise diode anodes and said second ends of said diodes comprise diode cathodes.

8. A battery compartment as claimed in claim 1, wherein said one of said group is centrally disposed on said one end.

9. A battery compartment as claimed in claim 1, wherein said cap couples to said compartment via a series of flanges disposed at outer edges of said cap, said flanges configured to engage and lock to grooves in said compartment with less than a quarter revolution of said cap.

10. A battery compartment as claimed in claim 1, further including a battery contact coupled to an interconnection disposed at an edge of said cap and adapted to make electrical contact to a contact disposed on said compartment when said cap is coupled to said compartment.

11. In a radio, a battery compartment including in combination:

an elongated body having a length, a height and a width and including a group of first contacts disposed at a first end thereof, wherein one of said group of first contacts is centrally disposed and is coupled to each of others of said group of first contacts by one of a group of diodes, each of said group of diodes having a first end coupled to not more than one of said others of said group of first contacts and a second end coupled to said one contact; and a cap adapted to couple to said elongated body, said cap including a battery contact connected to a contact disposed on an edge of said cap.

12. A battery compartment as claimed in claim 11, wherein said length is chosen to match lengths associated with more than one kind of battery.

13. A battery compartment as claimed in claim 11, wherein said length is chosen to be equal to three "C" cells stacked end to end.

14. A battery compartment as claimed in claim 11, wherein said height and width of said elongated body are equal to twenty-nine and a half millimeters and corners of said elongated body are curved to accommodate cylinders having a diameter of fourteen millimeters.

15. A battery compartment as claimed in claim 11, wherein said group of first contacts includes four first contacts, said four first contacts disposed symmetrically about a centrally-disposed first contact and separated therefrom by a center-to-center distance of about nine and nine-tenths millimeters.

16. A battery compartment as claimed in claim 11, wherein said diodes comprise diodes chosen from a group consisting of silicon Schottky barrier diodes, germanium diodes and silicon rectifiers.

17. A battery compartment as claimed in claim 11, wherein said first contact is centrally disposed on said cap, and wherein said first end of said first through fourth diodes comprise diode anodes and said second ends of said first through fourth diodes comprise diode cathodes.

18. A battery compartment as claimed in claim 11, wherein said cap couples to said compartment via a series of flanges disposed at outer edges of said cap, said flanges configured to engage and lock to grooves in said compartment with less than a quarter revolution of said cap.

19. A battery compartment as claimed in claim 11, further including a battery contact coupled to another contact disposed at an edge of said cap, said another contact adapted to make electrical contact to a contact disposed on said compartment when said cap is coupled to said compartment.

20. In a radio, a battery compartment including in combination:

an elongated body having a length, a height and a width and including contacts disposed at one end thereof, wherein said length is chosen to be equal to three "C" cells stacked end to end and wherein said height and width of said elongated body are equal to twenty-nine and a half millimeters and corners of said elongated body are curved to accommodate cylinders having a diameter of fourteen millimeters; and a cap adapted to couple to said elongated body at an end remote from said one end, wherein said cap couples to said compartment via a series of flanges disposed at outer edges of said cap, said flanges configured to engage and lock to grooves in said compartment with less than a quarter revolution of said cap, further including a contact disposed at an edge of said cap and adapted to make electrical contact to a contact disposed on said compartment when said cap is coupled to said compartment, wherein said contact disposed at an edge of said cap is also electrically coupled to a battery contact disposed on a face of said cap that is directed toward said elongated body when said cap is coupled thereto, said battery contact for contacting one or more terminals of batteries installed in said elongated body, said one end including:

a first contact, said first contact being centrally disposed on said cap and connected to a contact disposed on an edge of said cap; and four second contacts, wherein said second contacts are disposed symmetrically about said first contact and separated therefrom by a center-to-center distance of about nine and nine-tenths millimeters; and four diodes comprising diodes chosen from a group consisting of silicon Schottky barrier diodes, germanium diodes and silicon rectifiers, each said second contact connected to a diode anode wherein each diode has a cathode connected to said first contact.

* * * * *